United States Patent Office 3,151,111
Patented Sept. 29, 1964

3,151,111
PROCESS FOR PREPARING HYDRAZINO
S-TETRAZINES
Allen H. Remanick, Pasadena, Calif., assignor to Aerojet-General Corporation, Azusa, Calif., a corporation of Ohio
No Drawing. Filed Feb. 13, 1963, Ser. No. 259,775
7 Claims. (Cl. 260—241)

This invention relates to a method for the preparation of 1,2-dihydro-1,2,4,5-tetrazines. More specifically, this invention deals with a method for the production of 3,6 substituted 1,2-dihydro-1,2,4,5-tetrazines, preferably called 3,6 substituted 1,2-dihydro-s-tetrazines. The compounds which are prepared by the novel method of this invention are disclosed in assignee's copending U.S. application Serial No. 258,374, filed February 7, 1963.

It is an object of this invention to provide a greatly simplified method for the preparation of 1,2-dihydro-s-tetrazines. The novel compounds of this invention have use as explosives and as monomers for polymerization to high energy binders with aldehydes and/or boron containing compounds. They are also useful for intermediates for the synthesis of other tetrazines.

The compounds of this invention are produced by reacting 3,6-diamino-s-tetrazine with hydrazine to form either the mono-hydrazino or 3,6-dihydrazino-1,2-dihydro-s-tetrazine.

The general reaction scheme proceeds as follows:

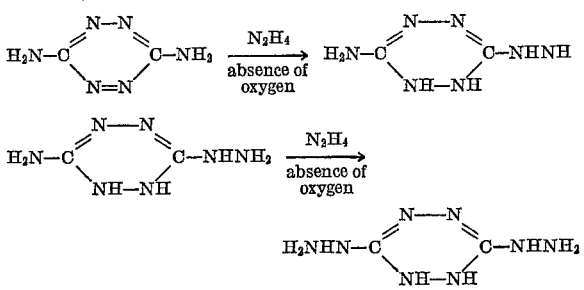

In general, the reaction of 3,6-diamino-s-tetrazine with hydrazine may be carried out at temperatures between about 20° C. to about 80° C. The pressure under which the process is carried out is not critical. Preferably, however, the process is conducted at atmospheric pressure or slightly higher although pressures up to 500 atmospheres may be employed if desired. It is essential in the reaction of 3,6-diamino-s-tetrazine with the hydrazine that the reaction take place in the complete absence of oxygen. If oxygen is not excluded during the reaction, 3,6-substituted-s-tetrazine is produced instead of the 3,6-substituted 1,2-dihydro-s-tetrazine.

An excess of hydrazine—more than 2 moles per mole of 3,6-diamino-s-tetrazine—is employed to form the solid 3,6-dihydrazino-1,2-dihydro-s-tetrazine. An excess is employed, from about 5 to about 30 moles hydrazine per mole of s-tetrazine, so that hydrazine also acts as the solvent for the reaction. When producing 3-amino-6-hydrazino-1,2-dihydro-s-tetrazine only a slight excess, about 5 percent hydrazine over the one mole hydrazine per mole of 3,6-diamino-s-tetrazine, may be used and an additional solvent such as an alcohol or dioxane is generally employed. The solid products may be recovered by any of the common liquid-solid separation means such as, decantation, filtration or centrifugation. The following examples are given in illustration of the novel method of my invention and are not intended to limit the scope of the invention. Parts and percentages are by weight unless otherwise indicated.

Example I

In a 3-neck, 100 ml. flask equipped with a 50 ml. pressure-equalized dropping funnel, nitrogen inlet, and nitrogen outlet, was placed 10 ml. hydrazine and 2.0 g. (0.018 mole) 3,6-diamino-s-tetrazine. The mixture was heated with stirring at 45° C. to 50° C. for three hours. Some precipitate appeared at this time. Addition of 50 ml. of degassed water and cooling to —5° C. produced an essentially colorless precipitate which was filtered under nitrogen and washed with cold ethanol. Drying in a nitrogen atmosphere gave 0.5 g. of powdered 3,6-dihydrazino-1,2-dihydro-s-tetrazine.

Example II 0.0134 mole of 3,6-diamino-s-tetrazine is mixed with .15 mole hydrazine in the presence of methanol. After stirring at 45° C. to 50° for three hours and cooling to —5° C. a colorless precipitate 3-amino-6-hydrazino-1,2-dihydro-s-tetrazine is formed. The product is filtered under nitrogen and dried in a nitrogen atmosphere.

Although the 1,2-dihydro-s-tetrazine compounds precipitate to some extent during reaction, addition of a non-solvent for the product such as, degassed water or a degassed alcohol such as, methanol, and cooling to less than about 0° C. will effectuate a complete precipitation of any 1,2-dihydro-s-tetrazine product which remains in solution. Preferably an excess of non-solvent is employed.

Having fully described the compounds, their mode of preparation, and their utilities it is desired that the invention be limited only by the scope of the appended claims.

I claim:
1. A method for the preparation of a compound selected from the group consisting of 3-amino-6-hydrazino-1,2-dihydro-s-tetrazine and 3,6-dihydrazino-1,2-dihydro-s-tetrazine which comprises reacting 3,6-diamino-s-tetrazine with hydrazine in the absence of oxygen.
2. The process of claim 1 in which the reaction takes place at a temperature from about 20° C. to about 80° C.
3. The process of claim 1 in which the reaction takes place under a nitrogen atmosphere.
4. The process which comprises reacting 3,6-diamino-s-tetrazine with hydrazine in the absence of oxygen and recovering the solid product thus produced.
5. The process of claim 4 in which the reaction takes place at a temperature of about 20° C. to about 80° C.
6. The process of claim 4 in which a non-solvent for the product is added to the reaction mixture, the reaction is cooled to a temperature of about 0° C. and the precipitate formed is recovered.
7. The process of claim 6 in which the anti-solvent is degassed water.

No references cited.